United States Patent
Longoria et al.

(10) Patent No.: US 8,539,482 B1
(45) Date of Patent: Sep. 17, 2013

(54) VIRTUAL-SERVER LICENSE STATUS DETERMINATION

(75) Inventors: Travis Page Longoria, Fort Collins, CO (US); Bradley Klein, Fort Collins, CO (US); Toran K Kopren, Fort Collins, CO (US); James Eugene Wade, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1217 days.

(21) Appl. No.: 12/262,110

(22) Filed: Oct. 30, 2008

(51) Int. Cl.
*G06F 9/455* (2006.01)

(52) U.S. Cl.
USPC .............................................................. 718/1

(58) Field of Classification Search
USPC .............................................................. 718/1
See application file for complete search history.

(56) References Cited

U.S. PATENT DOCUMENTS

| | | | |
|---|---|---|---|
| 7,313,512 B1* | 12/2007 | Traut et al. | 703/23 |
| 7,890,613 B2* | 2/2011 | Tameshige et al. | 709/220 |
| 2008/0133289 A1* | 6/2008 | Armour et al. | 705/7 |
| 2009/0328225 A1* | 12/2009 | Chambers et al. | 726/26 |

\* cited by examiner

*Primary Examiner* — Andrew Caldwell
*Assistant Examiner* — Benjamin Geib

(57) ABSTRACT

A virtual-server license status determination is made as a function a determination of the license status of the host on which said virtual server runs.

15 Claims, 1 Drawing Sheet

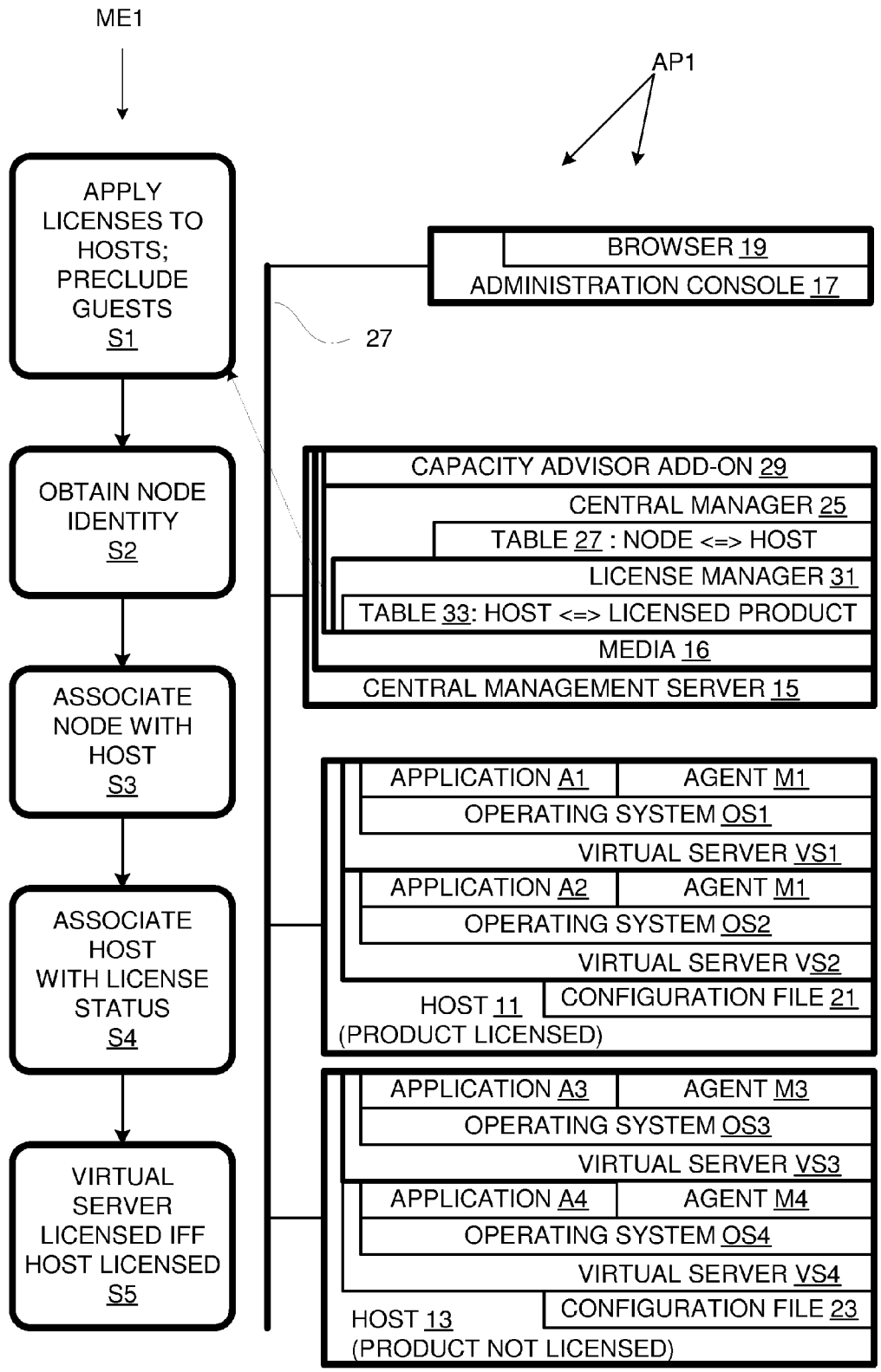

VIRTUAL-SERVER LICENSE STATUS DETERMINATION

BACKGROUND

Data centers and other large computer systems are often centrally managed. However, not all managed nodes necessarily need the same services. Accordingly, central-management software vendors sometimes permit customers to obtain licenses only for the hardware that needs the management features. For example, there would be no need to pay for a license for workload management for a server that runs a fixed workload, e.g., like the central-management server. In such a business model, it is necessary to determine what products are licensed for each server.

One way to keep track of licenses is to install license software and data on each licensed server. When the central-management software polls the managed servers, it can ask all the servers that it discovers to check their licensing status for a given management product. This approach has been extended to systems that include virtual servers.

Virtual-server technology can allow different operating system instances to run concurrently on a single computer system. Each operating system instance interacts with a host virtual-server operating system as though the latter were hardware. For most purposes, e.g., communicating over a network, there is no distinction between hardware servers and virtual servers running on a virtual-server host. Accordingly, license software can be installed on each virtual server on a licensed host so that when the virtual server is polled, it can inform central-management server that it is or is not licensed for a given management product.

BRIEF DESCRIPTION OF THE DRAWING

The FIGURE depicts implementations/embodiments of the invention and not the invention itself.

FIG. 1 is a combination system diagram and flow chart of aspects of an embodiment of the invention.

DETAILED DESCRIPTION

The present invention provides for cascading licenses through a hierarchy. Specifically, license information relating to a host can be applied to its virtual-server guest. Thus, to find out if a virtual server is licensed: 1) configuration data can be examined to identify the virtual server's host, 2) the host licensing status can be examined, and 3) the host's licensing status can be attributed to the virtual server. In other words, the licensing status of a host is cascaded to its guests. While the prior art allowed a virtual server's license status to be obtained directly from the virtual server itself, the present invention obviates the need to install status information on the virtual server. This achieves a considerable savings in time and effort for systems with a large number of virtual servers and for systems in which virtual servers are frequently created (e.g., as workloads are moved around).

In accordance with an embodiment of the invention, a data center AP1 includes host systems 11 and 13, a central-management server 15, and a console 17. Console 17 includes a browser 19 that permits a user to interact with central-management server 15. While the invention applies to systems that range widely in size and complexity, data center AP1 suffices to explain principles underlying the invention.

Host 11 hosts virtual servers VS1 and VS2, while host 13 hosts virtual servers VS3 and VS4. Each virtual server VS1-VS4 runs a respective application A1-A4, respective Web-Based Enterprise Management (WEBM) agents W1-W4, and respective operating system instances OS1-OS4. In addition, each host 11, 13 includes a respective configuration file 21, 23 that indicates what virtual servers are running on the host.

Whether or not a product is licensed on a particular host can change. For expository purposes, the management product of interest is licensed for host 11, but not licensed for host 13. In the illustrated example, this licensing information is maintained on central-management server 15. In alternative embodiments, license information is stored in configuration files on the hardware hosts.

Central-management server 15 is a hardware server that includes a manufacture in the form of computer-readable media 16 that is encoded with programs of computer-executable instructions. These programs include a central manager 25, which provides basic management functions through its communication with management agents M1-M4. One of the functions of manager 25 is to maintain a mapping of virtual servers to hosts, e.g., as gathered from hosts 11 and 13. Another function of manager 25 is to host add-ons such as central-management product add-on 29, which adds functionality to manager 25. For example, add-on 29 can provide for automated workload management or capacity planning that manager 25 can use in managing hosts 11 and 13 and virtual servers VS1-VS4.

Central manager 25 includes a license manager 31 that tracks which hosts are licensed for which products. Database table 33 indicates what hosts are licensed for each licensable product. As illustrated, media 16 stores an add-on 29 that is licensed for host 11, but not host 13.

The licensing status of add-on 29 can be determined in accordance with method ME1, implemented by central manager 25. At step S1, central manager 25 (thus central-management server 15) provides for a user to apply a license for add-on 29 to host 11. A licensed can be applied by storing license data on the host or by associating a license key with a host in a database. In addition, central manager 25 implements a tool definition policy, written in xml, precluding a user from accidentally applying licenses to a virtual server, e.g., virtual servers VS1-VS4. This ensures that the host will be the single license point when licensing for virtual servers.

At step S2, central manager 25 polls managed nodes for the identities. In general, virtual servers do not know they are virtual servers. Accordingly, it remains for central manager 25 to check on the node type.

At step S3, manager 25 makes a host determination of the host that the virtual server is running on. Since the polling does not indicate whether a node is a virtual server or a host, step S3 involves making this determination using table 27. If the node is a host, then it is the host referred to in step S4. If the node is a virtual server, table 27 will indicate the host on which it runs.

At step S4, a license determination is made of the license status of the host identified at step S3. If the node is a host, then its license status is what table 33 says it is. If the node is a virtual server, step S5 permits its licensing status to be determined as a function of the licensing status of its host. More specifically, the virtual server is licensed if and only if (iff) its host is licensed.

While it might seem more direct to determine the license status of a virtual server from the virtual server itself, this requires that the virtual server know its licensing status. This in turn requires storing licensing information on the virtual server or at least some software that can determine the licensing status on the virtual server. While this approach may be appropriate for system with a small constant set of virtual servers, installing licensing data or code on each virtual server in a system with a large number of virtual servers or in a system that creates virtual servers dynamically is burdensome. The present invention avoids the extra step involved in creating and managing virtual servers.

In one approach, hosts store licensing data that can be collected by a central manager, while in another approach, all licensing data is stored on the central manager. Both approaches are used in data center AP1 to accommodate differences in the platforms for hosts 11 and 13.

Cascading licenses as in system AP1 reduces the amount of licenses applied, and the amount of time needed to license virtual servers. Also, cascading simplifies the licensing process by defining a single "point of license". This simplifies licensing from the licensee's point of view. In addition, there are fewer places to manage and track licenses, from both a licensor and a licensee perspective. Furthermore, cascading eliminates the need to manage virtual-server guest licenses during virtual-server creation, destruction, and migration. Moreover, the cascading licensing model can quickly and easily be adapted to other parent-child product relationships, requiring licensing.

The present invention can be applied in computer systems of different sizes and complexity including large data centers and enterprise computing systems. Different approaches to licensing can be accommodating, including those that require files to be stored on licensed hosts and those that manage all licensing data centrally. These and other variations upon and modifications to the illustrated embodiment are provided by the present invention, the scope of which is defined by the following claims.

What is claimed is:

1. A method for making a virtual-server license status determination of whether or not a virtual server is licensed for management using a central-management product for managing servers in a centrally managed computer system, said method comprising:
    making, by a hardware central-management server (CMS), a host determination of the hardware host that said virtual server is running on;
    making, by said CMS, a host-status determination of whether or not said host is licensed for management by said product; and
    making, by said CMS, said virtual-server license determination as a function of said host-status determination
    wherein said central-management product is to execute on said CMS so as to manage virtual servers.

2. A method as recited in claim 1 further comprising obtaining an identity of a managed node, said host determination involving making a node-type determination of whether said managed node is said virtual server or said host by looking up said identity in a database on said CMS, said node-type determination providing said host determination.

3. A method as recited in claim 1 wherein said CMS uses said product in managing said virtual server.

4. A method as recited in claim 1 further comprising applying a license for said product to said host.

5. A method as recited in claim 4 wherein said applying includes precluding applying said license to said virtual server.

6. A method as recited in claim 1 wherein said virtual server is determined to be licensed for that product if and only if said host is licensed for said product.

7. A centrally managed computer system comprising:
    managed nodes including a virtual-server host and a virtual server running on said host; and
    a central-management server (CMS) to manage said nodes, said CMS maintaining databases indicating what virtual servers are running on what hosts and what hosts are licensed for a central-management product for managing servers, said CMS determining whether or not a virtual server is licensed for management using a product by determining what host said virtual server is running on and whether that host is licensed for said product, wherein said central-management product is to execute on said CMS so as to management virtual servers.

8. A system as recited in claim 7 wherein said CMS provides for a user to apply a license for said product to said host.

9. A system as recited in claim 8 wherein said CMS precludes a user from applying a license for said product to said virtual server.

10. A system as recited in claim 7 wherein said virtual server is determined to be licensed for that product if and only if said host is licensed for said product.

11. A manufacture comprising non-transitory computer-readable storage media encoded with programs of computer-executable instructions, said programs including a manager program to determine whether a managed node is a virtual server or a host for said virtual server, said file manager being to make a license determination whether said host is licensed for management using a given central-management product to manage servers and determining whether said virtual server is licensed for that product as a function of said license determination, wherein said central-management product is to execute on said central-management server so as to manage virtual servers.

12. A manufacture as recited in claim 11 wherein said programs includes said product.

13. A manufacture as recited in claim 11 wherein said programs maintain a database indicating whether not a host is licensed for said product.

14. A manufacture as recited in claim 11 wherein said programs maintain a database indicating which virtual servers are running on which nodes.

15. A manufacture as recited in claim 11 wherein said virtual server is determined to be licensed for that product if and only if said host is licensed for said product.

* * * * *

UNITED STATES PATENT AND TRADEMARK OFFICE
CERTIFICATE OF CORRECTION

PATENT NO. : 8,539,482 B1  
APPLICATION NO. : 12/262110  
DATED : September 17, 2013  
INVENTOR(S) : Travis Page Longoria et al.

Page 1 of 1

It is certified that error appears in the above-identified patent and that said Letters Patent is hereby corrected as shown below:

In the Specification

In column 2, line 35, delete "licensed" and insert -- license --, therefor.

Signed and Sealed this  
Third Day of June, 2014

Michelle K. Lee  
*Deputy Director of the United States Patent and Trademark Office*